US012024399B2

(12) United States Patent
Bohui et al.

(10) Patent No.: US 12,024,399 B2
(45) Date of Patent: Jul. 2, 2024

(54) GUIDING DEVICE FOR AN ELEVATOR DOOR LEAF

(71) Applicant: WITTUR HOLDING GmbH, Wiedenzhausen (DE)

(72) Inventors: Li Bohui, Suzhou (CN); Zhu Ancheng, Kunshan (CN); Peng Lingchao, Wujiang (CN)

(73) Assignee: WITTUR HOLDING GmbH, Wiedenzhausen (DE)

( * ) Notice: Subject to any disclaimer, the term of this patent is extended or adjusted under 35 U.S.C. 154(b) by 0 days.

(21) Appl. No.: 18/252,019

(22) PCT Filed: Oct. 26, 2021

(86) PCT No.: PCT/IB2021/059891
§ 371 (c)(1),
(2) Date: May 5, 2023

(87) PCT Pub. No.: WO2022/096984
PCT Pub. Date: May 12, 2022

(65) Prior Publication Data
US 2023/0416052 A1  Dec. 28, 2023

(30) Foreign Application Priority Data
Nov. 5, 2020  (IT) .................. 102020000026383

(51) Int. Cl.
*B66B 13/08* (2006.01)
*B66B 13/30* (2006.01)
*E05D 15/06* (2006.01)

(52) U.S. Cl.
CPC ............ *B66B 13/08* (2013.01); *B66B 13/301* (2013.01); *E05D 15/0643* (2013.01); *E05Y 2900/104* (2013.01)

(58) Field of Classification Search
CPC .. B66B 13/08; B66B 13/301; E05Y 2900/104
See application file for complete search history.

(56) References Cited

U.S. PATENT DOCUMENTS

| 1,274,872 A | * | 8/1918 | Gordon | ............... E05D 15/0665 |
| | | | | 49/425 |
| 2,668,317 A | * | 2/1954 | Le Bon, III | ........ E05D 15/0691 |
| | | | | 49/420 |
| 8,733,023 B2 | * | 5/2014 | Rahardjo | ................ B66B 13/08 |
| | | | | 49/411 |

FOREIGN PATENT DOCUMENTS

CN    206088701 U  *  4/2017
CN    108100837 A     6/2018
(Continued)

OTHER PUBLICATIONS

International Search Report and Written Opinion issued in connection with International Patent Application No. PCT/IB2021/056926, dated Jul. 29, 2021.

*Primary Examiner* — Diem M Tran
(74) *Attorney, Agent, or Firm* — Maschoff Brennan

(57) ABSTRACT

A guiding device for an elevator door leaf that includes a body within which at least a first cavity open outwards of said body. The guiding device also includes a first spherical element rotatably inserted in the first cavity and arranged so as to protrude from the first cavity outwards and anti-friction means interposed between the first spherical element and at least one wall delimiting the first cavity to limit the movement of the first spherical element within the first cavity.

17 Claims, 4 Drawing Sheets

(56) References Cited

FOREIGN PATENT DOCUMENTS

| | | | |
|---|---|---|---|
| CN | 210103259 U | | 2/2020 |
| CN | 111217225 A | | 6/2020 |
| JP | 2002308556 A | * | 10/2002 |
| KR | 200458149 A | | 1/2012 |

* cited by examiner

GUIDING DEVICE FOR AN ELEVATOR DOOR LEAF

TECHNICAL FIELD

The present invention relates to a guiding device for an elevator door leaf. The floor doors of lifts or elevators are normally provided below with shoes which slide into a groove obtained in the sill and have the purpose of guiding the doors during the opening and closing movement which occurs when the cabin is located at the floor door.

BACKGROUND

The known type of shoes adopted in this context include the use of an end portion which slides inside a track obtained in the sill. Both the end portion and the track have corresponding flat surfaces, therefore during the opening and closing movement of the door leaves a relative sliding occurs between two portions of flat surfaces. This causes high sliding friction leading to rapid wear of the components, for which periodic replacement of the shoes is necessary.

Since the shoes are fixed to the door leaves, the maintenance is long and costly.

Document CN108100837 A discloses an elevator sill assembly comprising a rolling mechanism arranged between the sliding block and the guide groove. The rolling mechanism includes a cage, a column roller and a ball. The column roller is mounted on the cage. Balls are provided on the column roller. Inside the guide groove, an inner race is provided. An outer race is provided, and a cylindrical roller is installed between the inner race and the outer race. When the column roller does not rotate, the elevator door can still be smoothly operated by the balls.

Document CN210103259 U shows an elevator door machine including a plurality of ball hinge structures for connecting door plates on the same straight line. The ball articulation structure includes a ball articulation base, and a corresponding articulated ball head 3. The latter is connected and extends downward and protrudes to the ball articulation base.

Document CN111217225 A discloses a silent dining ladder slide rail with a steel ball embedded in a ball pocket. One end of the steel ball close to the sliding rail protrudes from the end surface of the sliding block contacting the sliding rail. The steel ball is lubricated by spraying lubricating oil mist from an oil groove.

In this context, the technical task underpinning the present invention is to propose a guiding device for an elevator door leaf which obviates the drawbacks of the prior art as cited above.

SUMMARY

In particular, it is an object of the present invention to propose a guiding device for an elevator door leaf, in which the components have a longer life than the known solutions and therefore require less maintenance.

The stated technical task and specified aims are substantially achieved by a guiding device for an elevator door leaf, comprising:
- a body within which at least a first cavity open outwards of said body is obtained;
- a first spherical element rotatably inserted in the first cavity and arranged so as to protrude from the first cavity outwards;

anti-friction means interposed between the first spherical element and at least one wall delimiting the first cavity to limit the movement of the first spherical element within the first cavity.

In accordance with an embodiment, a second cavity open outwards of the body is obtained within the body and within which a second spherical element is rotatably inserted. The second spherical element is arranged so as to protrude from the second cavity outwards.

In accordance with an embodiment, the first cavity and the second cavity are separate, i.e., non-communicating.

Preferably, the first cavity and the second cavity are substantially identical in shape and size and are obtained within the body so that the first spherical element and the second spherical element protrude outside the body on opposite sides.

In accordance with an embodiment, the anti-friction means comprises at least one abutment sphere arranged within the first cavity. The abutment sphere has smaller dimensions with respect to the first spherical element. Preferably, the abutment spheres arranged within the first cavity are a plurality and are arranged circumferentially around the first spherical element.

In accordance with an embodiment, the body has a recess suitable for being coupled to a corresponding portion of a head of a door leaf.

In accordance with an embodiment, the first cavity is blind and has an opening outwards. The first spherical element is in contact with an edge of the body delimiting the opening.

BRIEF DESCRIPTION OF DRAWINGS

Additional features and advantages of the present invention will become more apparent from the illustrative and thus non-limiting description of a preferred but not exclusive embodiment of a guiding device for an elevator door leaf, as illustrated in the appended drawings, in which.

DETAILED DESCRIPTION

Figure 1:
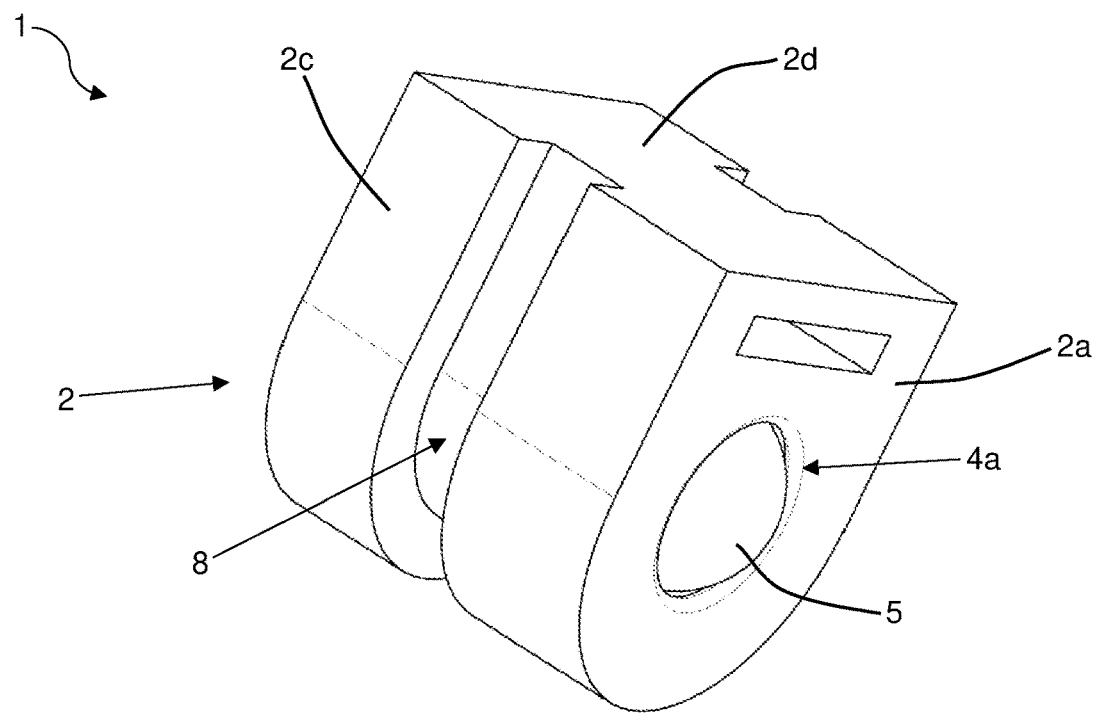
FIG. 1 illustrates a guiding device of an elevator door leaf, according to the present invention, in perspective view.
Figure 2:
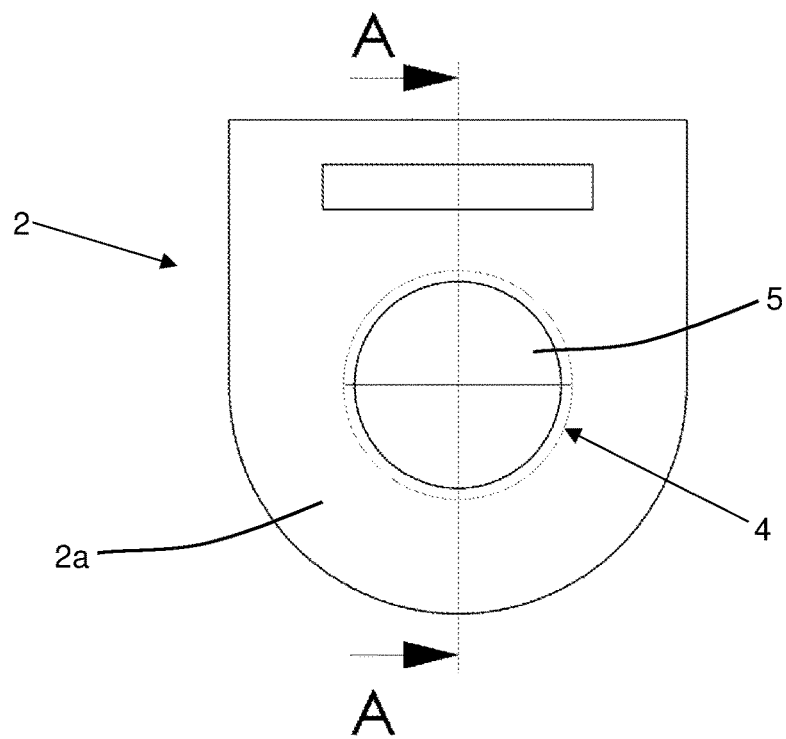
FIG. 2 illustrates a lateral view of the guiding device of FIG. 1.
Figure 3:
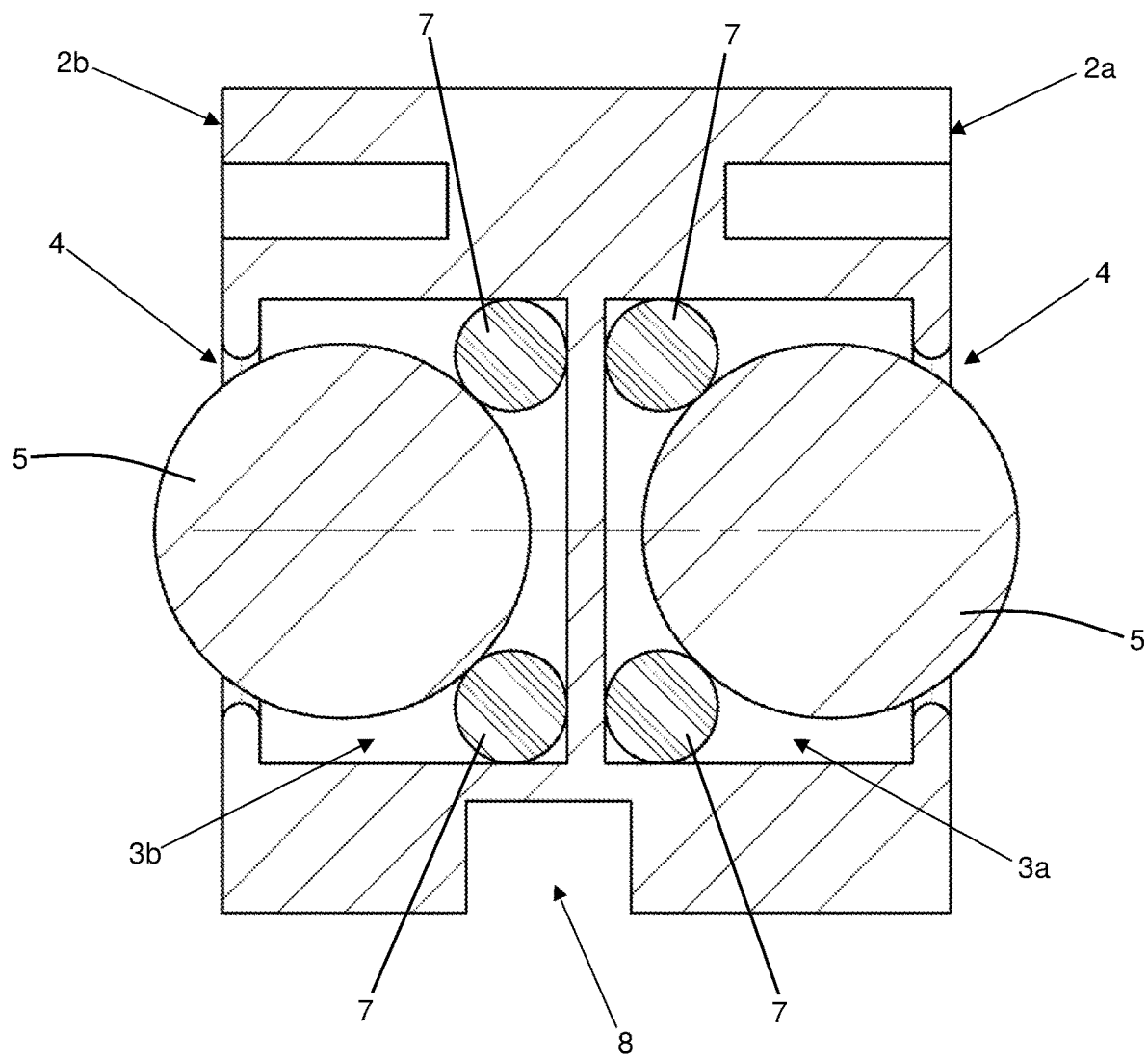
FIG. 3 illustrates a sectional view of the guiding device of FIG. 1 (according to the axis A-A visible in FIG. 2)
Figure 4:
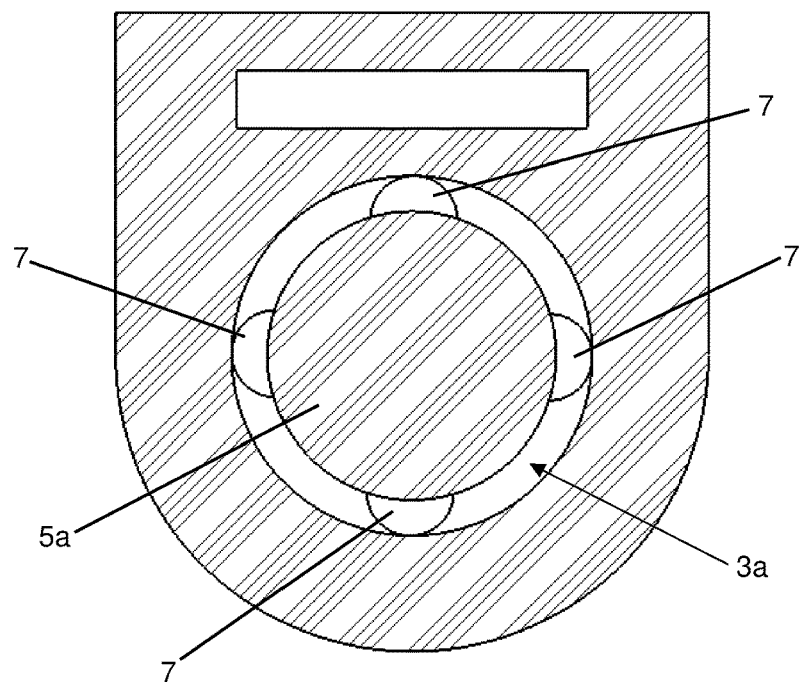
FIG. 4 illustrates a sectional view of the guiding device of FIG. 1 (section according to an axis orthogonal to the axis A-A visible in FIG. 2)

With reference to the figures, reference numeral 1 indicates a guiding device 1 of an elevator door leaf.

The guiding device 1 comprises a body 2 within which at least a first cavity 3a open outwards of the body 2 is obtained. In other words, the first cavity 3a communicates with the outside through an opening 4. Preferably, the first cavity 3a is blind. Preferably, the first cavity 3a has a substantially cylindrical shape.

A first spherical element 5a is rotatably inserted in the first cavity 3a. Such a first spherical element 5a is arranged so as to protrude outwards from the first cavity 3a. The portion of the first spherical element 5a protruding from the opening 4 is intended to roll on one of the surfaces of the sill of an elevator.

Preferably, the first spherical element 5a is arranged so as to be able to contact an edge 4a of the body 2 delimiting the opening 4.

In the embodiment described and illustrated herein, there are two cavities 3a, 3b open outwards of the body 2, each having a corresponding spherical element 5a, 5b therein free to rotate on itself and partially protruding outwards.

For reasons of clarity, the number 3b indicates the second cavity and the number 5b indicates the second spherical element.

In accordance with the embodiment described and illustrated herein, the two cavities 3a, 3b are separate, i.e., non-communicating.

Preferably, the two cavities 3a, 3b are substantially identical in shape and size and are obtained within the body 2 so that the first spherical element and the second spherical element 5b protrude outside the body 2 on opposite sides.

The guiding device 1 comprises anti-friction means 7 interposed between the first spherical element 5a and at least one wall delimiting the first cavity 3a to limit the movement of the first spherical element 5a within the first cavity 3a.

In particular, the anti-friction means 7 limits the translation of the first spherical element 5a inside the first cavity 3a without however preventing the rotation thereof.

Preferably, the anti-friction means 7 comprises at least one abutment sphere 7 arranged in the first cavity 3a. The abutment sphere 7 has smaller dimensions with respect to the first spherical element 5a.

Preferably, the abutment spheres housed within the first cavity 3a are a plurality. Preferably, the abutment spheres 7 are arranged circumferentially around the first spherical element 5a.

In the embodiment described and illustrated herein, there are four abutment spheres 7.

Thereby, the first spherical element 5a is interposed between the abutment spheres 7.

Also in the second cavity 3b there is anti-friction means 7 similar to that described for the first cavity 3a.

Preferably, the body 2 has a recess 8 suitable for being coupled to a corresponding portion of a head 11 of a door leaf 10.

In the embodiment described and illustrated herein, the body 2 comprises two opposite side surfaces 2a, 2b on which the openings 4 are obtained and a connecting surface 2c between the two side surfaces 2a, 2b. The recess 8 is obtained along the connecting surface 2c. Preferably, the recess 8 extends through the connecting surface 2c.

Preferably, the body 2 comprises a substantially flat upper surface 2d. The recess 8 extends from one side of the upper surface 2d to an opposite side according to a distancing/approaching extension with respect to the upper surface 2d which follows the connecting surface 2c.

Figure 5A:
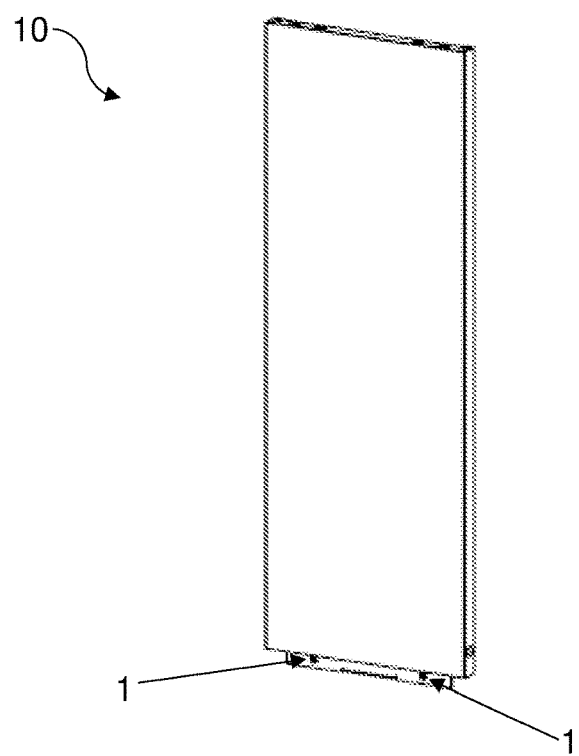
FIGS. 5a and 5b illustrate an elevator door leaf comprising the device of FIG. 1, in perspective view respectively from the front and from the back.
Figure 5B:
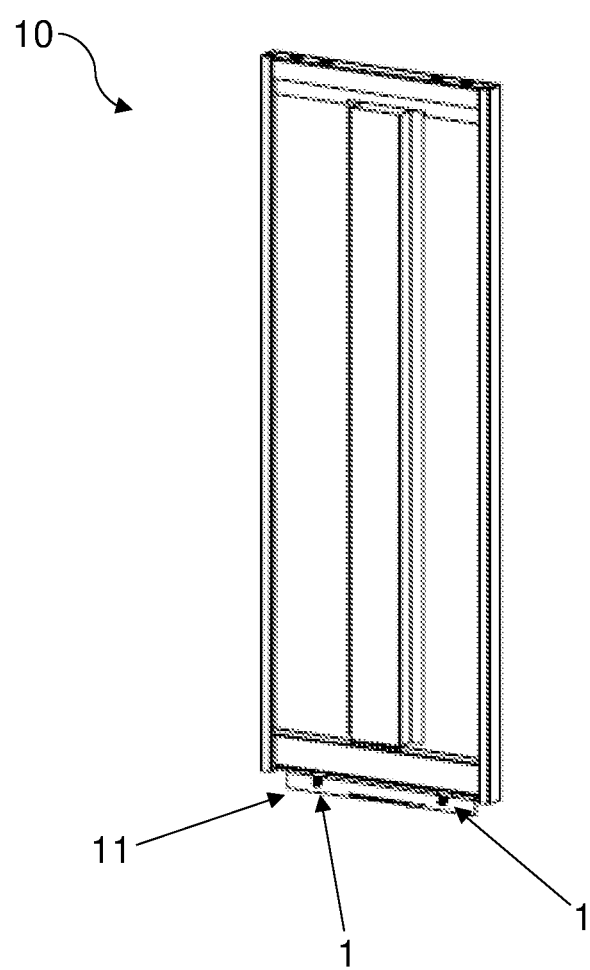

FIGS. 5a and 5b illustrate an elevator door leaf, indicated with the number 10.

The leaf 10 comprises one or more guiding devices 1 as described above. Preferably, the door leaf 10 comprises a head 11. The head 11 is a known type of device which couples with the sill of an elevator and will not be further described herein. The guiding devices 1 are coupled with the head 11.

In the embodiment in which the body 2 of the guiding device 1 has a recess 8, the guiding device 1 is coupled to the head 11 by means of the recess 8.

The features of the guiding device of an elevator door leaf, according to the present invention, are clear from the description, as are the advantages.

In particular, the provision of a rotatable spherical element in the cavity allows to obtain a rolling contact between the guiding device and the elevator sill, replacing the sliding of the known solutions. This reduces the wear on components, increasing the life thereof. Furthermore, it is no longer necessary to resort to the use of expedients to reduce the friction from sliding.

Furthermore, the use of anti-friction means allows the contact between the spherical element and the cavity to be minimized, limiting friction and wear. At the same time, the anti-friction means reduces or eliminates the lateral or translational displacement of the spherical element, constraining it to rotate on itself in its seat.

In accordance with common practice, the various features illustrated in the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A guiding device for an elevator door leaf, comprising:
    a body within which at least a first cavity is formed open towards an outside of said body in a first side surface and a second cavity is formed open towards the outside of said body in a second side surface, wherein the body comprises:
        a first connecting surface between the first side surface and the second side surface;
        a second connecting surface between the first side surface and the second side surface, wherein the second connecting surface has a curved shape portion that extends between a first side of the first connecting surface to a second side of the first connecting surface opposite the first side; and
        a recess extending from the first side of the first connecting surface to the second side of the first connecting surface through the second connecting surface;
    a first spherical element rotatably inserted in the first cavity and arranged so as to protrude outwards from the first cavity;
    a second spherical element rotatably inserted in the second cavity and arranged so as to protrude outwards from the second cavity; and
    anti-friction means interposed between the first spherical element and at least one wall delimiting the first cavity to limit movement of the first spherical element within the first cavity,
    wherein said anti-friction means comprises a plurality of abutment spheres arranged within said first cavity and circumferentially around the first spherical element, said abutment spheres having smaller dimensions than the first spherical element.

2. The guiding device according to claim 1, wherein said first cavity and said second cavity are separate.

3. The guiding device according to claim 2, wherein said first cavity and said second cavity are substantially identical in shape and size and are obtained within the body so that the first spherical element and the second spherical element protrude outside the body on opposite sides.

4. The guiding device according to claim 1, wherein the recess is suitable for being coupled to a corresponding portion of a head of a door leaf.

5. The guiding device according to claim 1, wherein said first cavity is blind and has an opening outwards, the first spherical element being in contact with an edge of the body delimiting the opening.

6. An elevator door leaf, comprising one or more guiding devices according to claim 1.

7. A guiding device for an elevator door leaf, comprising:
    a body within which at least a first cavity is formed open towards an outside of said body in a first side surface and a second cavity is formed open towards the outside of said body in a second side surface, the body comprising:
        a first connecting surface between the first side surface and the second side surface, the first connecting surface being flat; and
        a second connecting surface between the first side surface and the second side surface, the second connecting surface including a first flat face coupled to a first side of the first connecting surface, a second flat face coupled to a second side of the first connecting surface opposite the first flat face, and a curved face between the first flat face and the second flat face;
    a first spherical element rotatably inserted in the first cavity and arranged so as to protrude outwards from the first cavity;
    a second spherical element rotatably inserted in the second cavity and arranged so as to protrude outwards from the second cavity; and
    anti-friction means interposed between the first spherical element and at least one wall delimiting the first cavity to limit movement of the first spherical element within the first cavity,
    wherein said anti-friction means comprises a plurality of abutment spheres arranged within said first cavity and circumferentially around the first spherical element, said abutment spheres having smaller dimensions than the first spherical element.

8. The guiding device according to claim 7, wherein the body further comprises a recess extending through the curved face of the second connecting surface.

9. The guiding device according to claim 8, wherein the recess is suitable for being coupled to a corresponding portion of a head of a door leaf.

10. The guiding device according to claim 7, wherein said first cavity and said second cavity are substantially identical in shape and size and are obtained within the body so that the first spherical element and the second spherical element protrude outside the body on opposite sides.

11. The guiding device according to claim 7, wherein said first cavity is blind and has an opening outwards, the first spherical element being in contact with an edge of the body delimiting the opening.

12. An elevator door leaf, comprising one or more guiding devices according to claim 7.

13. A guiding device for an elevator door leaf, comprising:
    a body within which at least a first cavity is formed open towards an outside of said body in a first side surface and a second cavity is formed open towards the outside of said body in a second side surface, the body comprising:
        a first connecting surface between the first side surface and the second side surface;
        a second connecting surface between the first side surface, the second side surface, a first side of the first connecting surface, and a second side of the first connecting surface opposite the first side; and a recess extending from the first side of the first connecting surface to the second side of the first connecting surface through of the second connecting surface;

a first spherical element rotatably inserted in the first cavity and arranged so as to protrude outwards from the first cavity;

a second spherical element rotatably inserted in the second cavity and arranged so as to protrude outwards from the second cavity; and anti-friction means interposed between the first spherical element and at least one wall delimiting the first cavity to limit movement of the first spherical element within the first cavity, wherein said anti-friction means comprises a plurality of abutment spheres arranged within said first cavity and circumferentially around the first spherical element, said abutment spheres having smaller dimensions than the first spherical element.

14. The guiding device according to claim 13, wherein said first cavity and said second cavity are separate.

15. The guiding device according to claim 14, wherein said first cavity and said second cavity are substantially identical in shape and size and are obtained within the body so that the first spherical element and the second spherical element protrude outside the body on opposite sides.

16. The guiding device according to claim 13, wherein the recess is suitable for being coupled to a corresponding portion of a head of a door leaf.

17. An elevator door leaf, comprising one or more guiding devices according to claim 13.

* * * * *